(12) United States Patent  
Wineland (10) Patent No.: US 7,750,253 B2
(45) Date of Patent: Jul. 6, 2010

(54) CONVEYOR BELT SCALE SYSTEM

(75) Inventor: Gary Wineland, Roaring Spring, PA (US)

(73) Assignee: New Enterprise Stone and Lime Co., Roaring Spring, PA (US)

( * ) Notice: Subject to any disclaimer, the term of this patent is extended or adjusted under 35 U.S.C. 154(b) by 34 days.

(21) Appl. No.: 11/676,983

(22) Filed: Feb. 20, 2007

(65) Prior Publication Data

US 2007/0215391 A1 Sep. 20, 2007

Related U.S. Application Data

(60) Provisional application No. 60/775,058, filed on Feb. 21, 2006.

(51) Int. Cl.
*G01G 11/04* (2006.01)
(52) U.S. Cl. ................ 177/16; 177/119; 177/145
(58) Field of Classification Search .......... 177/16, 177/119, 145
See application file for complete search history.

(56) References Cited

U.S. PATENT DOCUMENTS

| | | | |
|---|---|---|---|
| 3,439,761 A | 4/1969 | Lamins | |
| 3,559,451 A | 2/1971 | Hyer et al. | |
| 3,603,416 A * | 9/1971 | Spurlin | 177/1 |
| 3,610,908 A | 10/1971 | Karosas | |
| 3,754,126 A * | 8/1973 | Williams, Jr. | 702/175 |
| 3,785,447 A * | 1/1974 | Blackerby | 177/119 |
| 3,924,729 A | 12/1975 | Flinth et al. | |
| 3,979,055 A | 9/1976 | Fathauer et al. | |
| RE29,944 E | 3/1979 | Hyer et al. | |
| 4,418,773 A * | 12/1983 | Finet et al. | 177/16 |
| 4,463,816 A | 8/1984 | MacFarlane | |
| 4,557,341 A | 12/1985 | Soderholm | |
| 4,682,664 A | 7/1987 | Kemp | |
| 4,788,930 A | 12/1988 | Matteau et al. | |
| 5,111,896 A * | 5/1992 | Porcari et al. | 177/16 |
| 5,294,756 A * | 3/1994 | Lauber et al. | 177/119 |
| 5,338,901 A * | 8/1994 | Dietrich | 177/16 |
| RE34,776 E | 11/1994 | Pratt | |
| 5,591,942 A | 1/1997 | Hyer | |
| 5,686,653 A * | 11/1997 | Homer et al. | 73/1.13 |
| 5,696,354 A * | 12/1997 | Linville et al. | 177/119 |
| 5,747,747 A * | 5/1998 | Cadou et al. | 177/145 |
| 5,970,712 A | 10/1999 | Stein | |
| 6,437,255 B1 * | 8/2002 | Ludescher | 177/16 |
| 7,331,210 B2 * | 2/2008 | Dietrich | 73/1.13 |
| 2002/0088268 A1 | 7/2002 | Parker | |
| 2004/0031310 A1 | 2/2004 | Shimizu | |
| 2004/0144185 A1 | 7/2004 | Bailey | |
| 2007/0074560 A1 * | 4/2007 | Dietrich | 73/1.13 |

* cited by examiner

*Primary Examiner*—Randy W Gibson
(74) *Attorney, Agent, or Firm*—Pepper Hamilton LLP (57) ABSTRACT

A scale may include a conveyor belt that carries a load, where the load has a weight. A generator is included that receives mechanical energy arising from movement of the conveyor belt and outputs electrical energy that corresponds to a rate of movement of the conveyor belt. At least one load cell receives the electrical energy from the generator, senses the weight of the load, and outputs a voltage that corresponds to the weight of the load and the rate of movement of the conveyor belt.

17 Claims, 8 Drawing Sheets

CONVEYOR BELT SCALE SYSTEM

B. CROSS-REFERENCE TO RELATED APPLICATIONS

This patent application claims priority to co-pending U.S. provisional patent application No. 60/775,058, filed on Feb. 21, 2006, entitled "Conveyor Belt Scale System", the disclosure of which is incorporated herein by reference in its entirety.

C. STATEMENT REGARDING FEDERALLY SPONSORED RESEARCH

Not applicable.

D. NAMES OF PARTIES TO A JOINT RESEARCH AGREEMENT

Not applicable.

E. SEQUENCE LISTING

Not applicable.

F. BACKGROUND

1. Technical Field

The disclosed embodiments generally relate to the field of conveyor belt weighing systems. More particularly, the description generally relates to generators as a means for providing excitation voltage for conveyor belt scales, and methods for using generators with conveyor belt scales.

2. Description of the Related Art

It is often desirable to measure and/or control the mass flow rate of material such as aggregate moving on a conveyor belt. By combining the weight of the material and the speed of the conveyor belt, a continuous indication of the mass flow rate of the material moving on the conveyor belt can be generated. Conveyor belt scales are integrated weighting devices that use one or more algorithms, such as a simple integral calculus summation process, to measure a conveyed quantity of material according to at least two variables: weight and speed. Both the need for totalized weight and the need for flow rate require similar components for the belt scale: a mechanical structure equipped with one or more weight measuring devices that supports a short section of the loaded belt and produces a signal indicative of the magnitude of the load, a belt motion measuring device, and an electronic signal processor that combines the weight and motion signals and computes totalized weight, belt speed, and material weight flow rate. The belt scale generally plays the role of a flow rate measurement. A separate plant control system may use the measurement information to change the flow rate as needed to meet momentary and changing demands.

A conveyor belt system typically includes one or more idlers connected mechanically to one or more load cells. An endless belt is looped around the idlers and the head and tail pulleys. One of the pulleys is driven so that the belt is continuously moving over the idlers. An electric motor is commonly used as the prime mover of a conveyor belt system, or any portions therein.

In the prior art, there are several devices and methods for detecting the weight of a load on a conveyor belt. Conventional belt scales include load cells situated below a conveyor belt that generate an output signal proportional to the weight of a load moving across a conveyor belt. See, for example, U.S. Pat. Nos. 3,478,830; 3,439,761; 3,785,447; 3,924,729; 4,682,664; 4,788,930; 4,463,816; and 4,557,341, the disclosures of each of which are incorporated herein by reference in their entirety. Many of the prior art devices utilize a mechanical weighframe or idler support structure, which Supports a section of the conveyor belt. A portion of the weighframe is often coupled to a strain gauge load sensors or load cell, where the strain gauge deforms proportionately to the load on the belt. The gauge's resistance varies as it deforms and by applying a voltage across the gauge, an electrical signal is generated which is proportionate to the weight of the load on the belt at a given instant in time. The load cell is a mechanical force to electrical signal transducer where any weight applied to the weighframe is transferred to the load cell for measurement. The weight signal that comes from the scale is a voltage having an amplitude proportional to the weight per length on the conveyor belt. If the weight on the belt increases, the load cell delivers a higher electrical signal, and as the weight decreases, it delivers a lower electrical signal. Although the load cell deforms proportionately to the load on the belt, the load on a moving belt generates forces in both a forward or horizontal direction (i.e. tangential forces caused from the moving belt) as well as a downward or vertical direction (i.e. the weight of the load). In conventional belt scales, a single load cell is typically located below the belt such that when the belt stops moving and the forward forces cease to exist, the downward forces measured by the load cell increase, thereby causing inaccuracies in the actual weight measurements.

U.S. Pat. No. 5,294,756, the disclosure of which is incorporated herein by reference in its entirety, describes a scale apparatus for weighing material moving on a conveyor belt supported by an idler assembly. The apparatus includes a load cell support and a load cell. The load cell includes a base and a contact portion extending upwardly away from the base. The base of the load cell is configured to bend in response to a vertical force being applied to the contact portion to generate an output signal proportional to the fore. The load cell is non-linear responsive to horizontal forces, which is best described as off-axis. The idler support applies a downwardly directed force to the contact portion of the load cell to bend the base of the load cell in response to material moving on the conveyor belt over the idler support to change the output signal generated by the load cell in proportion to the weight of the material. The magnitude of the force applied by the idler support changes as the weight of the material moving over the idler support changes.

The speed of the belt is another variable measured by conventional conveyor belt scales. Most conventional speed sensors, commonly referred to as "encoders," are rotary digital pulse generators, which can be optical, magnetic or other or off sensing units. They are typically mounted on a pulley or wheel that rotates as the belt moves, generating an on/off signal as they move that is directly proportional to the distance the belt moves and the speed of the belt. Generally, the encoder transmits more pulses as the belt speed increases, and less pulses as the belt speed decreases. These units typically mount to the non-drive end of the conveyor. U.S. Pat. No. RE 29,944, the disclosure of which is incorporated herein by reference in its entirety for example, describes a belt travel pulse generator that is coupled to a pulley that produces an output belt travel signal comprising a sequence of pulses on an electrical line. The belt travel signal pulses are generated by movement of the belt, or they may be generated by the power frequency if the drive means comprises a synchronous motor. The repetition rate of the pulses on the line is directly proportional to the belt velocity past the pulley. For example, the generator may generate one hundred pulses per revolution of the pulley which can be converted mathematically to be directly proportional to the belt speed in feet per minute.

Many applications of belt scale conveyor systems incorporate an electronic integrator which receives weight-related signals through an electrical wire from the belt scale and a belt speed signal through an electrical wire from the encoder. The integrator integrates the product of these two signals and provides an output signal which is indicative of the weight of material that passes on the portion of the belt associated with the scale input sensor. Electronic integrators of this type are well known in the art. U.S. Pat. No. 3,610,908, the disclosure of which is incorporated herein by reference in its entirety, for example, describes a solid-state electronic integrator system that includes dipout pulses to afford continuous running and automatic self-compensation with respect to control signal variation. This system receives variable amplitude flowing weight signals and variable frequency speed signals and integrates them, providing a digital signal that is a function of the gravimetric flow rate. U.S. Pat. No. 3,559,451, the disclosure of which is incorporated herein by reference in its entirety, describes a totalizing and flow rate measuring system which includes an integrator of the type noted above to generate a digital weight signal which is subsequently processed to produce output signals or indications representative of the cumulative weight and the instantaneous flow rate of material on the belt which passes the input sensor of the scale.

Newer systems are making a transition to a fully digital approach, where a microprocessor often takes over both speed control and electronic commutation. The controller or microprocessor draws its current or power from the electric lines, provides an excitation voltage for the load cell, receives the variable voltage from the output of the load cell, provides excitation voltage for the encoder and receives the signal from the encoder. It is desirable to minimize the amount of control electronics needed to run the belt scale system, the number of lines running between the controller and the load cell and encoder. Relying on voltage and signal wires from the load cell and encoder makes the systems more susceptible to lightning strikes.

The disclosure contained herein describes attempts to address one or more of the problems described above.

G. SUMMARY

An embodiment of a scale may include a conveyor belt that carries a load and the load has a weight. A generator may be included that receives mechanical energy arising from the movement of the conveyor belt and outputs an electrical energy that corresponds to a rate of movement of the conveyor belt. At least one load cell may be included. The at least one load cell receives the electrical energy from the generator, senses the weight of the load, and outputs a voltage that corresponds to the weight of the load and the rate of movement of the conveyor bell.

Further embodiments may include a roller that rotates in response to the movement of the conveyor belt. The roller may be operably connected to the generator to provide the mechanical energy to the generator. In embodiments, the roller may be selected from the group consisting of a wheel, a conveyor pulley, and an idler roller.

The at least one load cell may be a strain gauge load cell, a hydraulic load cell a hydrostatic load cell, or a piezoelectric load cell. In some embodiments, the at least one load cell may be an S-beam load cell.

In still further embodiments, a scale may include a conveyor belt, and a roller that rotates in response to a movement of the conveyor belt. A generator may be operably connected to the roller and may produce a generator electrical signal that corresponds to a speed of the conveyor belt. The generator electrical signal may include a voltage and a current.

A first load cell may be included, and the first load cell may receive the generator electrical signal. In embodiments, the first load cell may sense a weight of a load on the conveyor belt, and may output a first electrical signal that corresponds to the weight of the load on the conveyor belt and to the speed of the conveyor belt. The first electrical signal may include a voltage and a current.

A second load cell may be included, and the second load cell may receive the generator electrical signal. In embodiments, the second load cell may sense the weight of the load on the conveyor belt, and may output a second electrical signal that corresponds to the weight of the load on the conveyor belt and to the speed of the conveyor belt. In still further embodiments, the first load cell and the second load cell are positioned so that an average of the first electrical signal and the second electrical signal may substantially independent of the speed of the conveyor belt.

In embodiments the roller may be selected from the group consisting of a wheel, a conveyor pulley, and an idler roller. In still further embodiments, the first and second load cell may be S-beam load cells.

Embodiments of a belt scale system may also include an idler, which may further include a roller assembly. The first and second load cells may be positioned on opposite sides of the roller assembly, where the first load cell may face a direction of travel of the conveyor belt, and the second load cell: faces an opposite direction of travel of the conveyor belt.

In embodiments, the idler may include a base structure located under and coupled to the roller assembly. The base structure may further include a first recessed cradle, within which the first load cell is disposed, and a second recessed cradle, within which the second load cell is disposed. The first cradle and the second cradle may be located at opposed corners of the base structure. In embodiments, a plate may be coupled to the roller assembly and provides pressure on the first load cell and the second load cell, where the pressure is proportional to the weight of the load on the conveyor belt.

An embodiment may include a method of weighing material on a moving conveyor belt, A method may include placing a material that has a weight onto a conveyor belt. The conveyor belt may be moved at a desired speed. In an embodiment, a roller may be contacted with the moving conveyor belt, where the roller rotates in response to movement of the conveyor belt. Further embodiments may include outputting a generator voltage from a generator operably connected to the roller, wherein an amplitude of the generator voltage corresponds to the speed of the conveyor belt, and inputting the generator voltage to an at least one load cell. The at least one load cell may be positioned to sense the weight of the material. In embodiments with more than one load cells, the load cells may be positioned in a fashion so that the average output of the load cell voltages may be substantially independent of the speed of the conveyor belt. A load cell voltage may be outputted which may be determined from the relationship of the generator voltage and the sensed weight of the material. The weight of the material may be determined from a correlation of the load cell voltage with a calibrated load cell voltage.

In embodiments, the calibrated load cell voltage may be determined from a calibration method consisting of a static weight calibration, a material calibration, a two-point material calibration, or mixtures thereof. Embodiments may include establishing a linear offset for the calibrated load cell voltage when a linear discrepancy is encountered. Still further embodiments may include correlating the load cell voltage with the calibrated load cell voltage using a computing apparatus.

In method embodiments, the at least one roller may selected from the group consisting of a wheel, a conveyor pulley, an idler roller, and mixtures thereof, and the at least one load cell may be selected from the group consisting of a strain gauge load cell, an hydraulic load cell, an hydrostatic load cell, a piezoelectric load cell, and mixtures thereof. In another embodiment, determining the weight of the material may include sensing the weight using a strain gauge. In embodiments, the weight sensor may include an S-beam load cell.

I. DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

Figure 1:
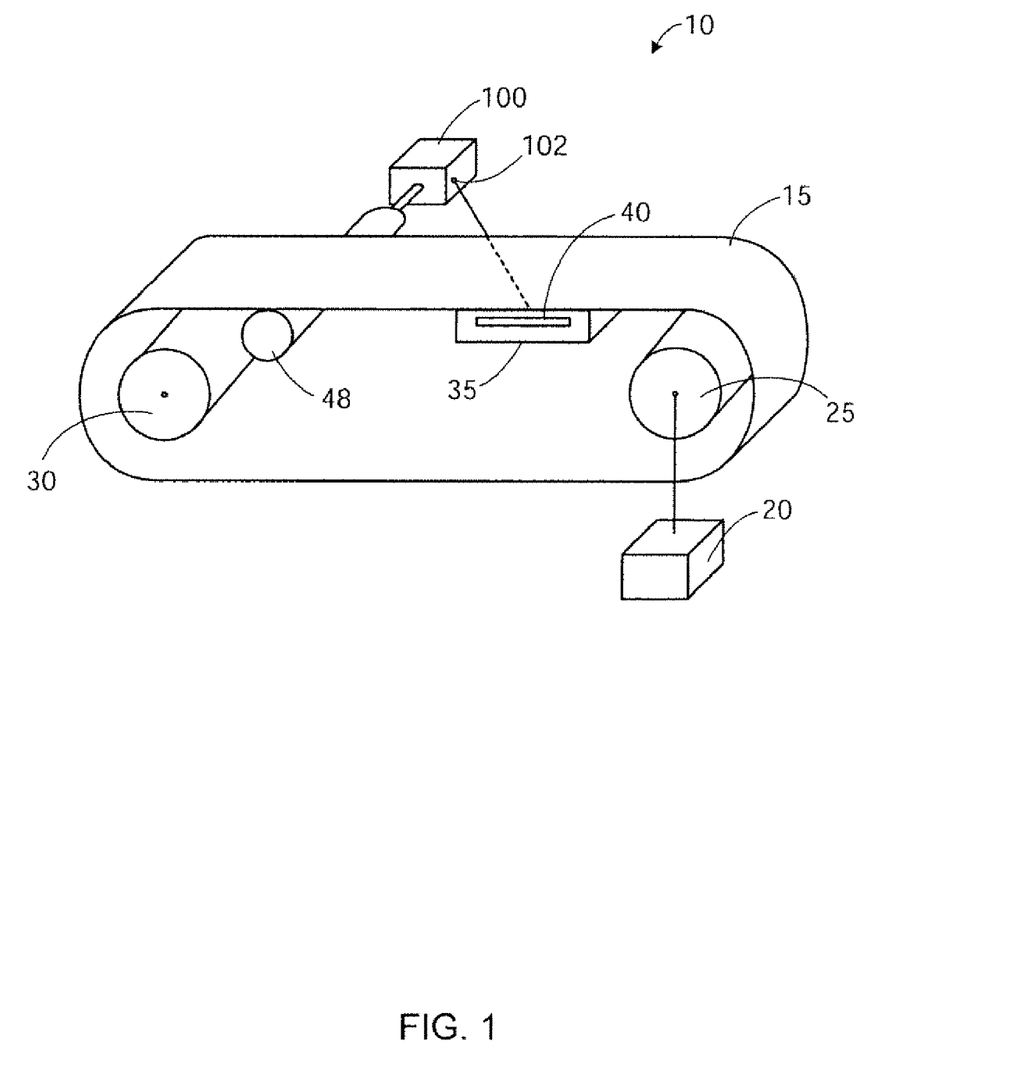
FIG. 1 depicts an exemplary embodiment of a conveyor belt scale system.

In accordance with one embodiment, a conveyor belt scale system 10, as illustrated in FIG. 1, may include a conveyor belt 15 that has at least one belt drive mechanism or motor 20 which drives the conveyor belt 15 around a set of pulleys 25, 30. A pulley may be any type of a pulley, roller, gear, or any type of wheel including at least one groove in which any type of rope, cable, chain, or belt may run such that when the pulley is moved or turned, the rope, cable, chain, or belt will also move or rotate in the same directions. Other types of conveyor systems or roller assemblies may also be used. The drive motor 20 may include, for example, a DC or AC motor connected to the discharge end pulley 25. The motor may, however, be connected to the system at any other location. Also, there may be multiple motors, each optionally driving a separate pulley that may be synchronized to turn the multiple pulleys and distribute the load accordingly. A second pulley 30 is located at the tail end of the belt. Optionally, one or more additional pulleys may be located at various positions between the discharge end pulley 25 and the tail end pulley 30. In operation, the motor 20 drives the pulley 25 which, in turn, produces a motion in the belt 15 so that material deposited on the top surface of the belt 15 is transported in a direction toward the discharge end 25.

Figure 2:
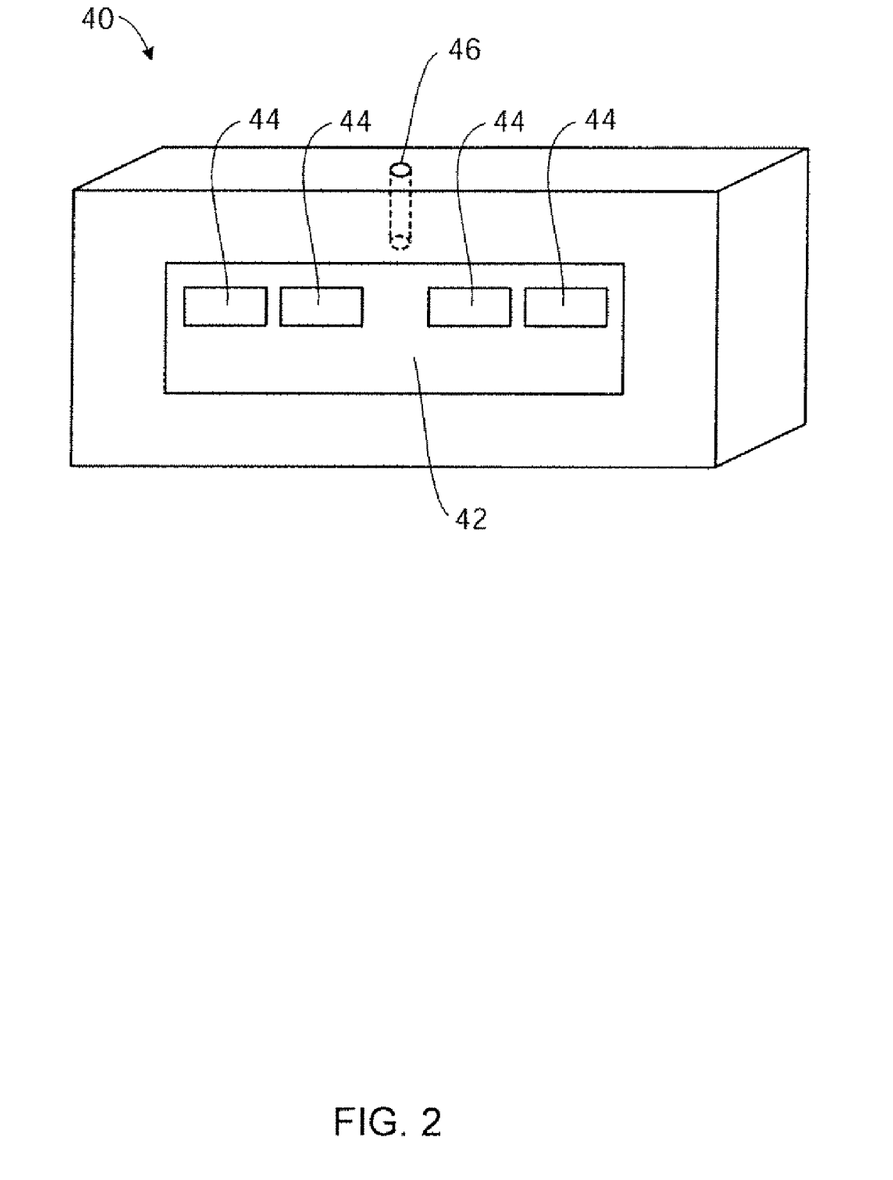
FIG. 2 depicts an exemplary embodiment of a load cell.

A weighframe 35, or roller support structure, supports a section of the conveyor belt that includes a load cell 40. As depicted in FIG. 2, the load cell 40 includes a recessed section 42. The recessed section 42 includes at least one weight sensor such as a strain gauge 44 that deforms proportionately to the load on the belt. The gauge's 44 resistance varies as it deforms, and by applying a voltage across the gauge 44, an electrical output signal is generated which is proportionate to the weight of the load on the belt 15 at a given instant in time. The weight signal that comes from the load cell of the scale is a DC voltage having an amplitude proportional to the weight per length on the conveyor belt 15. The signal may be transmitted through a wire that extends through an aperture 46 in the load cell 40. Alternatively or in addition, the signal be may transmitted by any now or hereafter known wireless method to a receiver. If the weight on the belt 15 increases, the load cell 40 delivers a higher electrical signal, and if the weight decreases, it delivers a lower electrical signal.

Although strain gauge load cells are the most common, there are other types of load cells as well. In industrial applications, a hydraulic (or hydrostatic) is probably the second most common, and these are utilized to eliminate some problems with strain gauge load cell devices. As an example, a hydraulic load cell is immune to transient voltages (lightning) so might be a more effective device in outdoor environments. Other types include piezoelectric load cells (useful for dynamic measurements of force), and vibrating wire load cells, which are useful in geomechanical applications due to low amounts of drift. All effective load cells that are known by persons of ordinary skill in the art now or hereafter are within the scope of embodiments herein.

Figure 3:
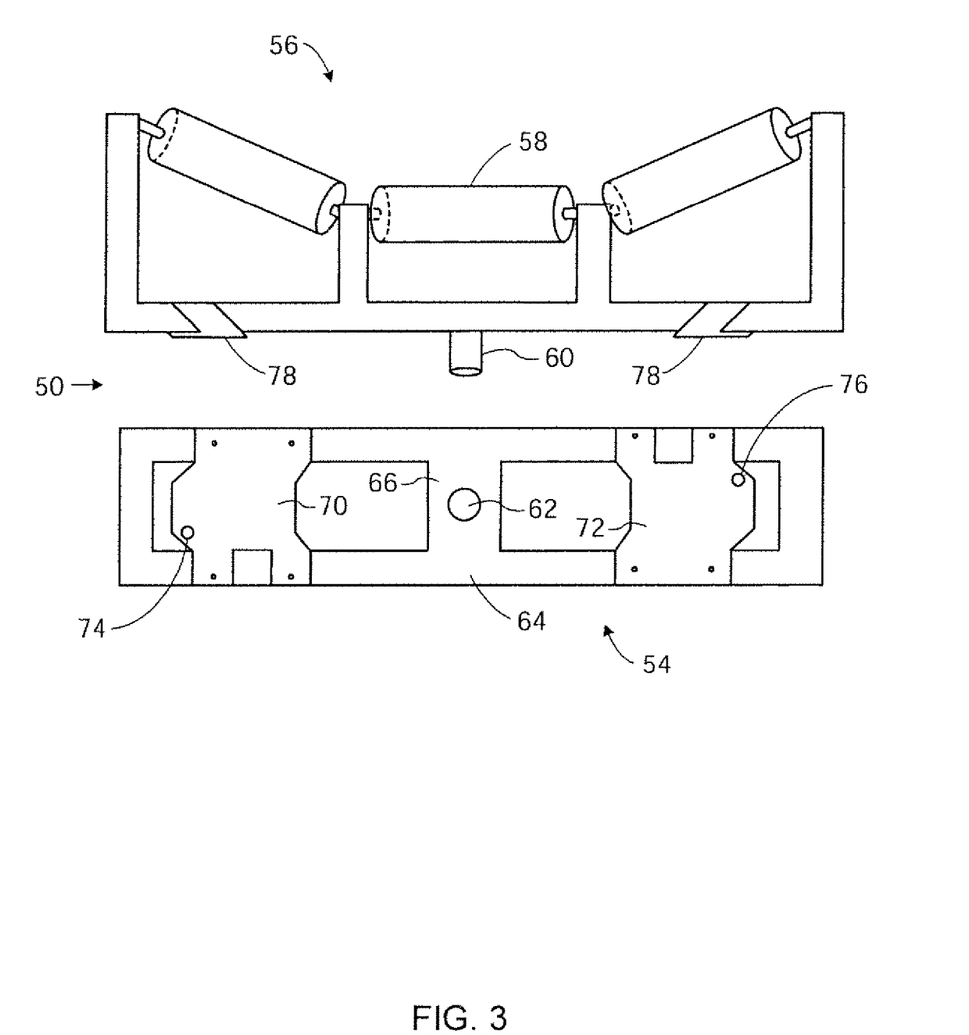
FIG. 3 depicts an idler assembly.
Figure 4:
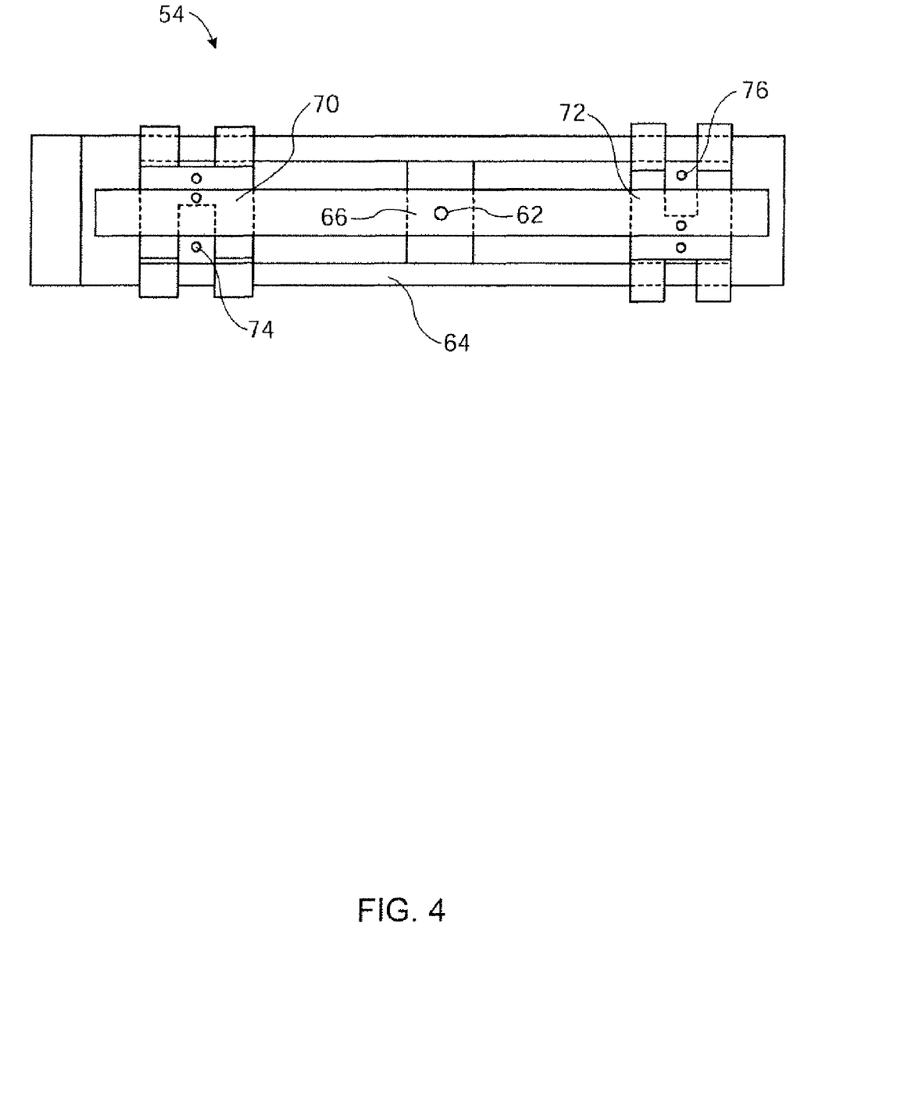
FIG. 4 depicts an exemplary base section of an idler assembly.

Alternatively or in addition, an idler such as a training idler or any other idler assembly known in the art supports a section of the conveyor belt as depicted in FIGS. 3 and 4. FIG. 3 depicts an idler assembly 50. The idler may include a base section 54 and a roller assembly 56. FIG. 4 depicts an exemplary base section 54 of an idler assembly 50. The roller assembly 56 includes at least one roller 58 located underneath the conveyor belt (not shown) that moves in the direction of the belt and at least one post 60 that inserts vertically into an aperture 62 in the base section. The roller assembly 56 may be structured to move or swivel in relation to the base 54 and/or slightly adjust as the load on the conveyor belt varies. The base 54 includes a rectangular frame 64 including a solid center section 66 containing at least one aperture 62, and two recessed cradles 70, 72 located at opposite sides of the base. Each cradle includes at least one load cell 74, 76. The load cells are located at diametrically opposed corners of each other in relation to the rectangular frame 64, such that the first load cell 74 is located in the front corner and the second load cell 76 is located in the back corner. A plate 78, which is preferably flat, may be coupled to the roller assembly 56 at the point where the roller assembly 56 meets the recessed cradles 70, 72, such that the plate 78 contacts the load cells 74, 76 when post 60 is inserted into aperture 62. As the load on the conveyor belt increases, the plate 78 provides pressure on the load cells 74, 76. Each load cell 74, 76 may include at least one weight sensor such as a strain gauge that deforms proportionately to the load on the belt 15.

The diametrically opposed location of the load cells 74, 76 in relation to the rectangular frame 64 causes the first load cell 74 to measure a lesser amount of vertical force than second load cell 76. This is because the forward directional forces created from the moving belt cause the belt to move tangentially such that it raises slightly in the front and deforms slightly in the back. Thus, the locations or positioning of the load cells 74, 76 may allow the average forward directional forces measured by the load cells 74, 76 to become minimal or approach zero. As such the average overall load measurement will remain relatively constant regardless of the belt speed. The resistance of the gauges on the load cells 74, 76 vary as they deform, and by applying a voltage across each gauge, an electrical output signal is generated which is proportionate to the weight of the load on the belt at a given instant in time. In an embodiment, the weight signal that comes from each load cell 74, 76 is a DC voltage having an amplitude proportional to the weight per length on the conveyor belt. If the weight on the belt increases, each load cell 74, 76 delivers a higher electrical signal, and if the weight decreases, each delivers a lower electrical signal. The load cells 74, 76 may be calibrated by measuring the signal produced by loads of predetermined weights and by subtracting the weights of the roller assembly 56, conveyor belt, and any other mass that may contribute to the forces measured by the load cells 74, 76.

Referring to back to FIG. 1 in embodiments, any type of a roller 48 or wheel may be contacting a portion of the conveyor belt 15. The roller 48 is connected to a generator 100. The roller 48 rotates in response to the movement of the conveyor belt 15. The electrical signal, also referred to herein as the load excitation voltage or electrical energy, generated by the generator 100 is determined by the speed of the roller 48. The generator 100 supplies the electrical energy to the load cell 40 by a generator output 102. The generator output 102 may be electrically connected by hard wire to the load cell input (not shown) of the load cell 40. The load excitation voltage may also be transferred by a wireless connection from the generator output to the load cell input by any method that is known now or hereafter to one of ordinary skill in the art. The amplitude of the load excitation voltage varies according to the speed of rotation of the roller 48, which is directly proportional to the speed of rotation of the belt 15. A weight sensor (not shown) that may be part of a load cell 40 and the sensor senses a weight on the roller 48 is electrically connected to the load cell input and to a load cell output (not shown). The load cell output outputs a load cell output voltage. The load cell output voltage varies with the load cell excitation voltage and the weight sensed by the weight sensor.

In an embodiment, the roller 48 may include a conveyor pulley or an idler roller. Load cells 40 in embodiments, may be strain gauge load cells, hydraulic load cells, hydrostatic toad cells, piezoelectric load cell, and mixtures thereof, load cells 40 can include any force-to-electricity transducer, known now or hereafter by one of ordinary skill in the art, that is capable of sensing the weight on the conveyor belt 15 and transferring the weight to an electrical signal. In embodiments, the w-eight sensor includes a strain gauge.

Referring now to FIG. 3, embodiments of an idler 50 or portion of a weighframe may include a roller assembly 56 that includes at least one roller 58. Embodiments further include a generator (not shown) that produces a generator electrical signal in response to the rotation of the at least one roller 58. The generator converts mechanical energy arising from movement of the conveyor belt into electrical energy. The amplitude of the generator signal varies according to the speed of rotation of the roller. The generator signal may be a voltage or a current. An embodiment includes a first load cell 74. The first load cell 74 further includes a first load cell input that is connected to an output (not shown) of the generator so that the first load cell 74 receives the generator electrical signal. The first load cell also includes a weight sensor (not shown) that senses the weight on the roller assembly 56. The weight sensor is electrically connected to the first load cell input of the first load cell 74 to deliver a first electrical signal having an amplitude that varies according to the sensed weight.

An embodiment still further includes a second load cell 76. The second load cell 76 further includes a second load cell input that is connected to the output of the generator so that the second load cell 76 receives the generator electrical signal. The second load cell also includes a weight sensor (not shown) that senses the weight on the roller assembly 56. The weight sensor is electrically connected to the second load cell input of the second load cell 76 to deliver a second electrical signal having an amplitude that varies according to the sensed weight.

A load cell is typically an electronic device (transducer) that is used to convert a force into an electrical signal. The force to be sensed may be the force on a deforming strain gauge. The resistivity of the strain gauge varies with the amount of force or weight sensed by the strain gauge. By applying a load cell excitation voltage from the generator to the load cell input of the load cell and across the determined strain gauge, the load cell converts the deformation (strain) to an electrical signal. More specifically, because of the change in resistivity of the deforming strain gauge, the load cell excitation voltage is changed as it passes the strain gauge of the load cell due to changes in resistivity of the strain gauge, and results in a changed load cell output voltage. Simply, the change in the amplitude of the load cell output voltage from the load cell excitation voltage is at least partially a result of deforming strain gauge and its change in resistivity, and the operation of Ohm's law, in which in its most simple form states that voltage is a function of current multiplied by resistance, or $V=IR$. The load cell output voltage is then a function of the load cell excitation voltage from the generator, and change in resistance of the strain gauge (weight sensor). After calibration of the scale system, the load cell output voltage can be directly correlated to the weight or flow rate of material on a conveyor.

Normally, a load cell includes four strain gauges in a Wheatstone bridge configuration, but is also available with one or two strain gauges. The electrical signal output is normally in the order of a few millivolts and may require amplification by an instrumentation amplifier before it can be used.

Figure 5:
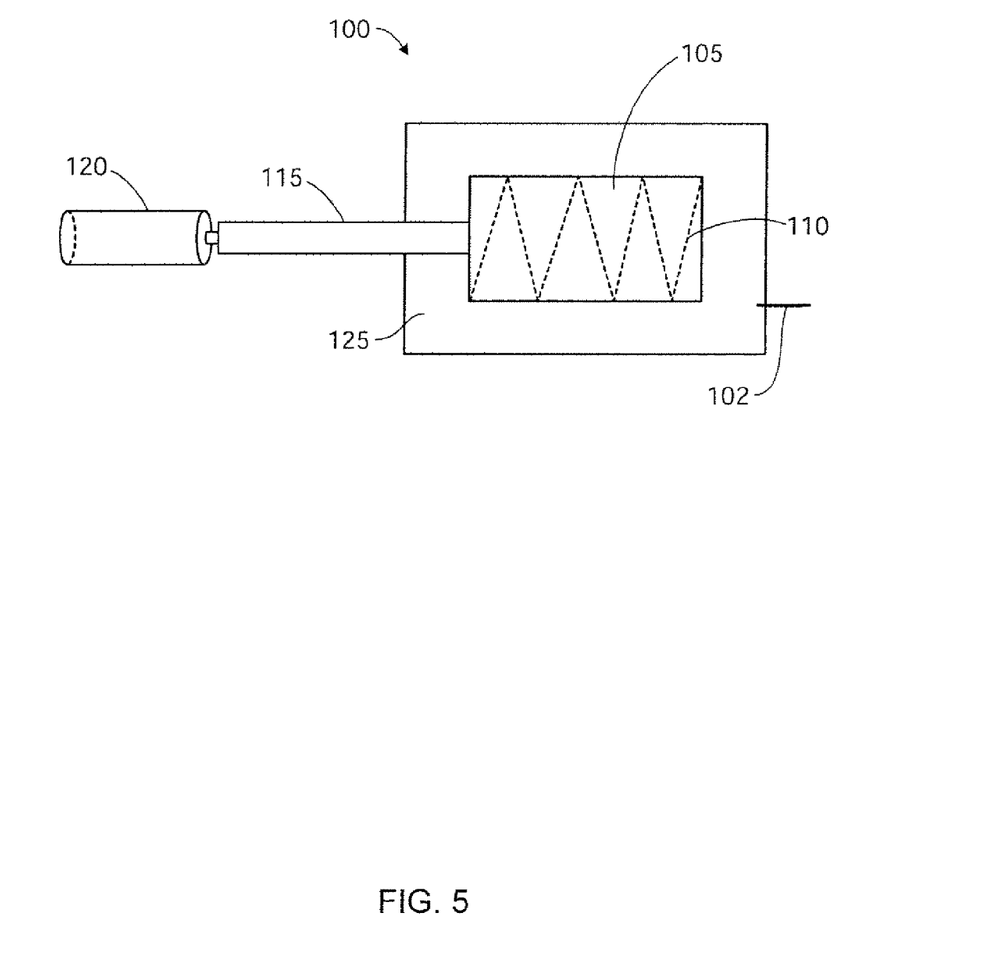
FIG. 5 depicts an exemplary embodiment of a generator.

As illustrated in FIG. 5, the generator 100 includes an armature 105 made up of flue wire windings or coils 110 coupled by a shaft 115 to a pulley or roller such as roller 120. It is recognized that the roller may include any type of wheel that is in contact with the moving conveyor belt. A roller 120 may include a pulley of the conveyor belt system, or any roller that is part of a weighframe or idler. The roller 120 rotates the armature 105 via the shaft 115 inside a stator cavity 125. As the armature 105 turns, an electric current or voltage is produced in the wire or coils 100. The current and voltage will be directly proportional to the speed that the armature spins 10. The current and voltage are supplied to at least one load cell (not shown) by a generator output 102, as discussed above.

In practice of embodiments herein the voltage output of the generator is determined by the speed of the roller, which corresponds to the speed of the conveyor belt. The speed that the belt is traveling can be initially determined in calibrating the conveyor belt scale system using a tachometer or other devise known to those of skill in the art. The voltage measured from the generator can then be converted into a belt speed, which may be in the units of feet per minute. Using combinations of pre-measured belt speeds with known weights and known output of the generator (load cell excitation voltage), an empirical relationship may be developed that correlates an output voltage of the load cell with a weight or a mass flow rate on the conveyor belt. The weight of the load and the rate of movement of the conveyor belt may be determined. All voltages, currents, and other electrical signals may be controlled, monitored, and/or recorded by a computing apparatus. The determination of the weight on the conveyor belt or the mass flow rate may be performed by, for example, a computing apparatus that uses the load cell signal or predetermined weight data as a variable along with other data, such as product density, belt size, and/or other information to calculate a flow rate. Computing apparatus of this type are well known to those of ordinary skill in the art and need not be further discussed herein.

Figure 6:
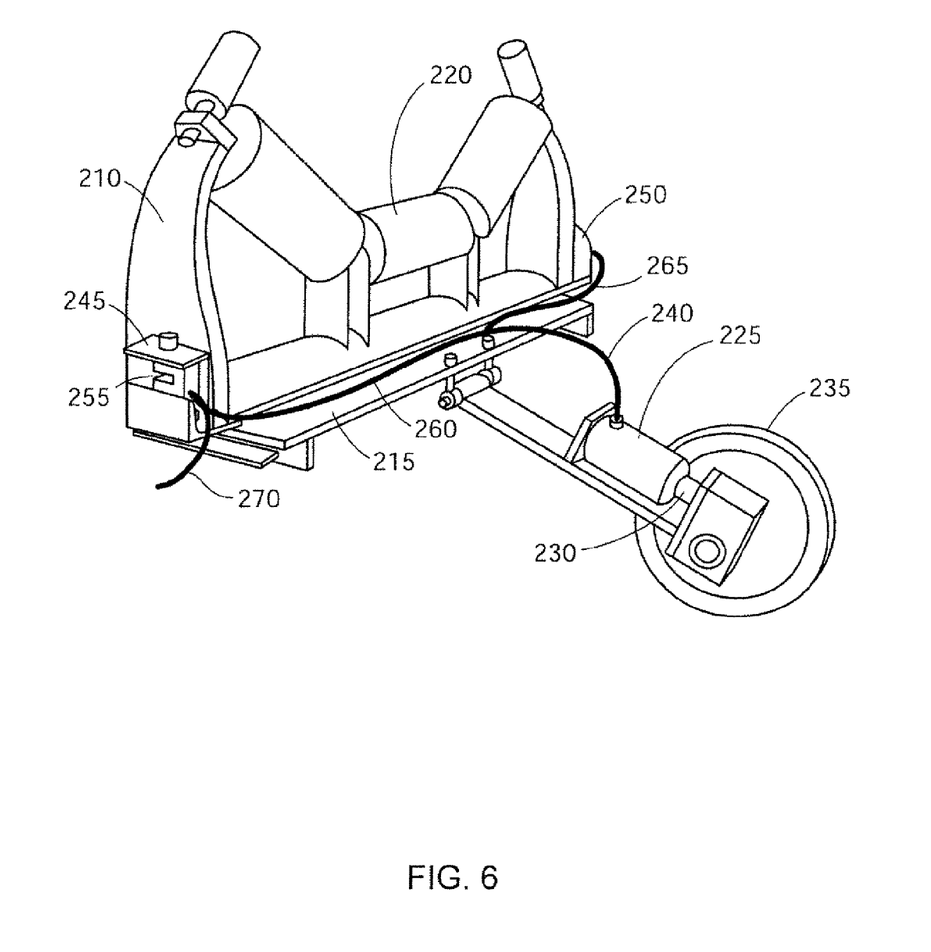
FIG. 6 depicts an embodiment of a conveyor belt scale system with two S-beam load cells on the side of a roller assembly.

An embodiment of a conveyor belt scale system that includes an idler and "S"-beam load cells 200 is depicted in FIG. 6. The S-beam load cells get their name from the strain gauge being shaped like the letter "S". In an embodiment, the scale system includes an idler 205. The idler may include a roller assembly 210 and base section 215. The roller assembly 210 may include at least one roller 220. Embodiments of the scale system include a generator 225. The generator may be connected by an armature 230 to a wheel 235. The wheel 235 is in contact with the conveyor belt (not shown), and turns at the comparable speed of the conveyor belt. The generator includes a generator output 240, which outputs the voltage from the generator 225. The amplitude of the voltage is determined by the speed of the turning wheel 235, and accordingly, the speed of the moving conveyor belt.

Figure 7:
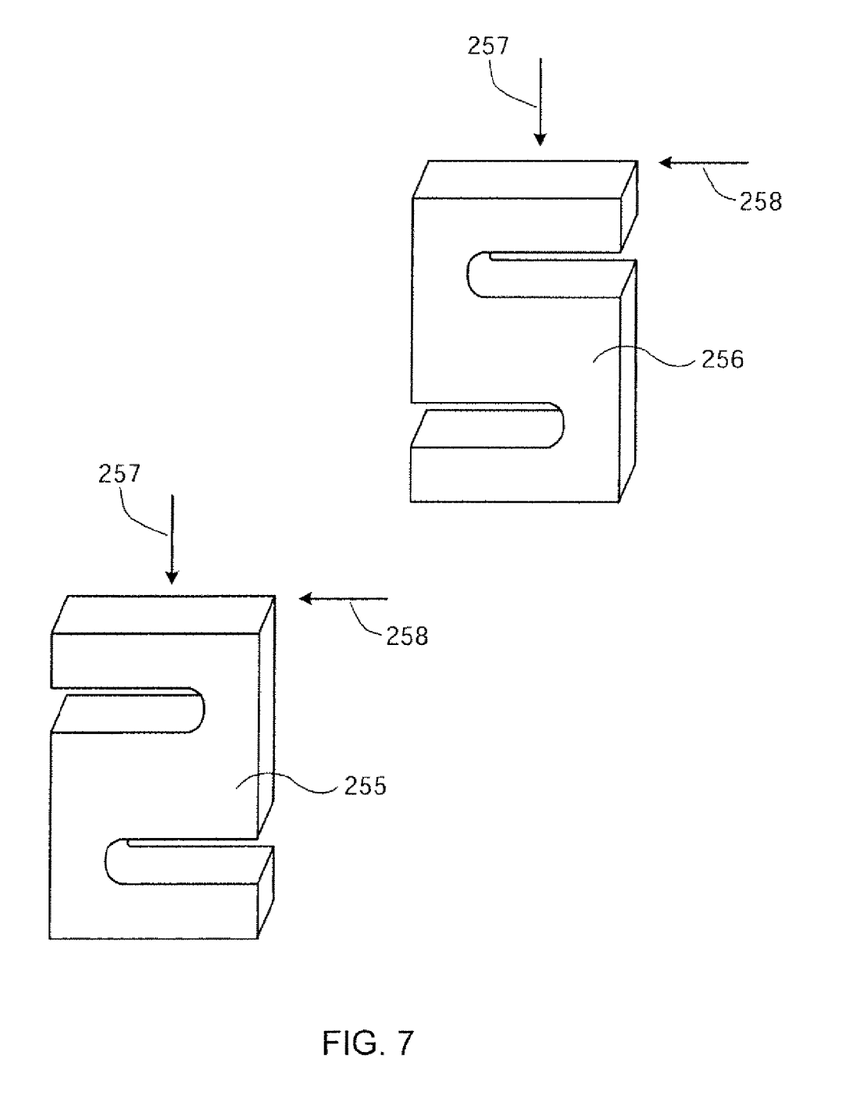
FIG. 7 is a depiction of S-beam load cells.
Figure 8:
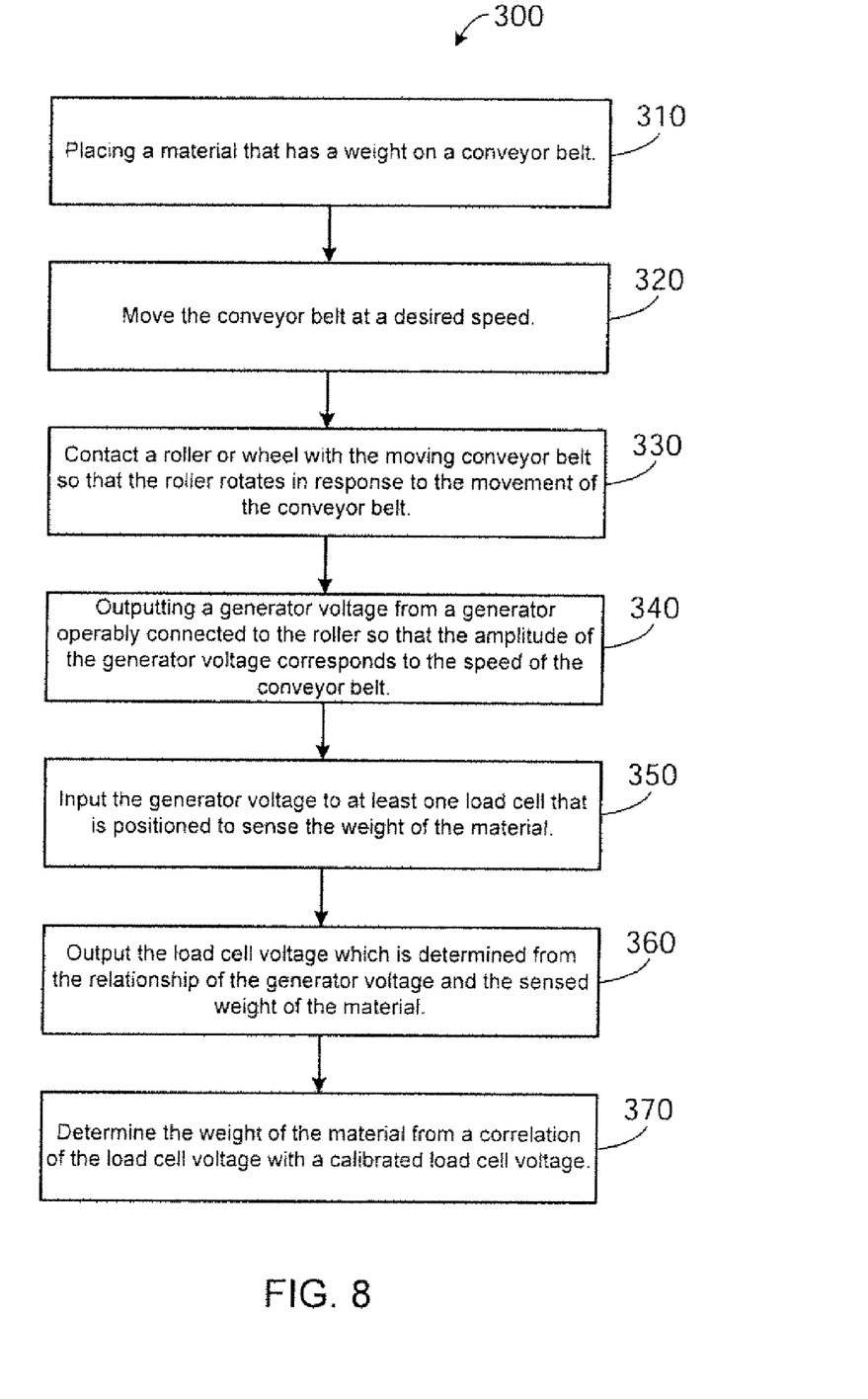
FIG. 8 is a flow diagram of a method of weighing material on a moving conveyor.

Referring now to FIGS. 6 and 7, the system includes a first 245 and a second load cell 250. The first 245 and second load cells 250 include a first weight sensor 255 and second weight sensor 257. In the embodiment of FIGS. 6 and 7, the weight sensor 255 is an S-beam, strain gauge, but it is realized that other weight sensors known now or hereafter by one of ordinary skill in the art are encompassed herein. The load cells 245 and 250 are positioned on the sides of the roller assembly 210 so that the weight sensors 255 and 256 sense the vertical or downward force 257 from the weight of the load on the roller assembly 210. The first load cell 245 is positioned in a forward direction, that is, facing the direction of movement of the belt 258, and the second load cell 250 is positioned in a backwards direction, that is, opposite of the direction of the movement of the conveyor belt. It is recognized that the directional positioning of the first 245 and second load cells 250 may be reversed and still be within the scope of embodiments herein. Positioned in this opposing fashion, the forward directional (horizontal) force sensed by the first weight sensor 255 may contribute to a compressive stress on the first weight sensor 255 and may contribute a positive voltage to the first load cell 245 voltage output. The forward directional force sensed by the second weight sensor 256 may contribute to a tensile stress on the second weight sensor 256) and may contribute a negative voltage to the second load cell 250 voltage output. Thus, when the output of the first load cell 245 is averaged with the output of the second load cell 250) the contribution of the forward force to the averaged load cell output is substantially balanced. In alternative embodiments, the first load cell may be positioned in front of the second load cell, with respect to the movement of the conveyor belt, and may further be diametrically opposed with respect to the movement of the conveyor belt, so that the contributions of the forward forces experienced by each load cell is balanced in the average load cell output. It is recognized by one of ordinary skill in the an that the terms positive and negative voltages, as used hereinabove, are relative and the polarity of the voltages may be reversed depending upon the directional positioning of the S-beam load ells and the system wiring configuration.

The generator output 240 is electrically connected to the first load cell input 260 of the first load cell 245 and to the second load cell input of the second load cell 250. The electrical signal or voltage that is output from the generator 225 is electrically connected to the weight sensors 255 and 256 of the first 245 and second 250 load cells. In the embodiments of S-beam weight sensors 255 and 256 as depicted in FIGS. 6 and 7, the weight of the material on the conveyor belt causes the S-beam strain gauges to deflect an amount proportional to the weight of material on the conveyor belt. This causes a change in resistivity of the strain gauge. Therefore, the voltage output by the strain gauges varies as the weight on the conveyor belt varies, since the voltage is directly proportional to the resistance, as discussed supra. In an embodiment the load cells 245 and 250 include a first load cell output 270 and a second load cell output (not shown). The load cell outputs may be hard wired or wireless, including any form of wireless transmission known now or hereafter to a person of ordinary skill in the art. The load cell outputs may be routed to a computing apparatus that may correlate the load cell output with the weight of material on the conveyor belt or the mass flow rate on the moving conveyor belt.

The conveyor belt scale system may be calibrated using any standard method of calibration, such as, for example, static weight calibration or material calibration. A calibrated load scale voltage may be determined to correlate load cell outputs with weight or mass flow rate on the belt.

Static weight calibration uses known standard weights to calibrate a signal produced by a load cell over a defined range. More specifically, the computing apparatus that may be used to read the load cell signal assigns an offset to the signal in order to correlate the signal to the particular standard weights. For example, in a three-point calibration technique, three different standard weights (e.g., 300 pounds, 600 pounds, and 900 pounds) are used to produce three different millivolt signals from each load cell. The computing apparatus establishes a linear function between the averaged load cell signals generated by the 300 pound and 900 pound weights. An averaged signal from the 600 pound weight is then read by the computing apparatus. If the signal from the 600 pound weight deviates from the established linear function, the signal is assigned an offset by the computing apparatus to compensate for the deviation.

Material calibration uses a known weight of material that is transferred along the conveyor belt under normal operating conditions. For this type of calibration, the signal read by the computing apparatus computing the material transfer or flow rate is calibrated using different material weights at one speed or one material weight at different speeds. Material weight can be obtained by, for example, weighing a test load in a bin supported by load cells or a truck scale. The material can be weighed before or after the test, but it is critical that the weighing device used for the test load be accurate and calibrated to a reliable standard.

To perform a material calibration at two weights (i.e., a two-point calibration) the generator is set to operate at one speed. A material having a first weight is placed on the conveyer so that the signal produced by the load cells corresponds to a known load. This signal establishes a baseline for the computing apparatus. A material having a second weight is then placed on the conveyer to produce a load cell signal corresponding to another known load. The second signal is compared to the expected signal for the second known load. If the second signal does not match the expected signal, a linear offset is established by the computing apparatus with respect to the first and second signals.

By way of example, if a 2 millivolt signal is generated by placing a first material weighing 400 pounds on a conveyor traveling at 60 feet per second, it might be expected that a material weighing 800 pounds will produce a signal of 4 millivolts. If 800 pounds of material were then placed on the conveyer and the load cell produced a 3.9 millivolt signal, the computing apparatus would establish a linear offset to compensate for the discrepancy.

Alternately, the belt speed may not need to be determined when the belt scale system is calibrated by a method of running the belt, loading a container, such as a truck, and weighing the truck before and after loading. For example, a scale factor is set so that the belt scale system display reads 1000 tons per hour (tph) when the load cell voltage is at 8 millivolts (mV). The belt is run for a certain period of time with material on it. After loading the display may indicate that 20 total tons was delivered to the truck. When the truck is weighed, the actual amount of material delivered, is for example 25 total tons. Dividing the actual amount by the displayed amount provides a factor that is used to adjust the system display reading. In this example, the division yields a factor of 1.25, which is then multiplied by the set value of 1000 tph at 8 mV, so that the system is reset to read 1250 tph at 8 mV.

An embodiment of a method of weighing material on a moving conveyor belt 300 is depicted in the flow diagram of FIG. 7. A method 300 may include placing a material that has a weight on a conveyor belt 310. The method may include moving the conveyor belt at a desired speed 320. Embodiments include, contacting a roller or wheel with the moving conveyor belt so that the roller rotates in response to the movement of the conveyor belt 330. A generator voltage may be outputted from a generator operably connected to the roller, so that the amplitude of the generator voltage corresponds to the speed of the conveyor belt 340. A method may include, inputting the generator voltage to at least one load cell that is positioned to sense the weight of the material 350. The method may further include outputting the load cell voltage, which is determined from the relationship of the generator voltage and the sensed weight of the material 360. The method may further include, determining the weight of the material from a correlation of the load cell voltage with a calibrated load cell voltage 370.

The incorporation of a generator to power load cells, where the amplitude of the output, or the voltage, from the generator corresponds to the speed of the conveyor belt eliminates the need for an encoder, which has been used traditionally in belt scale systems. This also eliminates the need for power transmission lines to an encoder and to the load cells, which substantially reduces the chances of lightening, damage to the belt scale system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A scale, comprising:
a conveyor belt that carries a load, wherein the load has a weight;
a discharge end pulley and a tail end pulley;
a motor that drives the discharge end pulley to produce a motion in the conveyor belt so that the load is transported along the belt in a direction toward the discharge end pulley;
a roller that is operably connected to the conveyor belt and rotates in response to a movement of the conveyor belt;
a generator that is operably connected to the roller and outputs an electrical energy that corresponds to a rate of movement of the conveyor belt;
a weightframe that supports the conveyor belt, the weightframe comprising:
at least one load cell,
wherein the at least one load cell receives the electrical energy from the generator and senses the weight of the load; and
wherein the at least one load cell generates an electrical signal having an amplitude that corresponds to the weight of the load and the rate of movement of the conveyor belt, and
an idler assembly, comprising:
a roller assembly comprising:
at least one roller, and
at least one post that inserts into at least one aperture,
a base comprising:
the at least one aperture,
two recessed cradles located at opposite sides of the base, wherein each cradle comprises at least one of the load cells, and
a plate coupled to the roller assembly at a point where the roller assembly meets each recessed cradle such that the plate contacts the at least one load cell when the at least one post inserts into the at least one aperture, wherein the plate applies pressure on the at least one load cell as the load increases.

2. The scale of claim 1, wherein the roller is operably connected to the generator to provide mechanical energy to the generator.

3. The scale of claim 2, wherein the roller is selected from the group consisting of a wheel, a conveyor pulley, and an idler roller.

4. The scale of claim 1, wherein the at least one load cell comprises a strain gauge load cell, a hydraulic load cell, a hydrostatic load cell, or a piezoelectric load cell.

5. The scale of claim 1, wherein the at least one load cell comprises an S-beam load cell.

6. A scale, comprising:
a conveyor belt;
a roller that rotates in response to a movement of the conveyor belt;
a generator that is operably connected to the roller and produces a generator electrical signal that corresponds to a speed of the conveyor belt;
a weightframe that supports the conveyor belt, the weightframe comprising:
a first load cell and a second load cell,
wherein the first load cell receives the generator electrical signal;

wherein the first load cell senses a weight of a load on the conveyor belt; and wherein the first load cell outputs a first electrical signal that corresponds to the weight of the load on the conveyor belt and to the speed of the conveyor belt;

wherein the second load cell receives the generator electrical signal;

wherein the second load cell senses the weight of the load on the conveyor belt; and wherein the second load cell outputs a second electrical signal that corresponds to the weight of the load on the conveyor belt and to the speed of the conveyor belt; and wherein the first load cell and the second load cell are positioned so that a contribution of forward force measured by each of the cells to an average of the first electrical signal and the second electrical signal is substantially balanced, and an idler assembly, comprising:
a roller assembly comprising:
at least one roller, and
at least one post that inserts into at least one aperture,
a base comprising:
the at least one aperture,
two recessed cradles located at opposite sides of the base, wherein each cradle comprises at least one of the load cells, and
a plate coupled to the roller assembly at a point where the roller assembly meets each recessed cradle such that the plate contacts the at least one load cell when the at least one post inserts into the at least one aperture, wherein the plate applies pressure on the at least one load cell as the load increases.

7. The scale of claim 6, wherein the roller is selected from the group consisting of a wheel, a conveyor pulley, and an idler roller.

8. The scale of claim 6, wherein the first and second load cell comprise an S-beam load cell.

9. The scale of claim 6,
wherein the first load cell faces a direction of travel of the conveyor belt; wherein the second load cell faces an opposite direction of travel of the conveyor belt.

10. The scale of claim 6, wherein the pressure is proportional to the weight of the load on the conveyor belt.

11. A method of weighing material on a moving conveyor, comprising:
placing a material onto a conveyor belt, wherein the material has a weight;
moving the conveyor belt at a desired speed;
supporting the conveyor belt with a weightframe, the weightframe comprising:
at least one load cells,
an idler assembly, comprising:
a roller assembly comprising:
at least one roller, and
at least one post that inserts into at least one aperture,
a base comprising:
the at least one aperture,
two recessed cradles located at opposite sides of the base, wherein each cradle comprises at least one of the load cells, and
a plate coupled to the roller assembly at a point where the roller assembly meets each recessed cradle such that the plate contacts the at least one load cell when the at least one post inserts into the at least one aperture, wherein the plate applies pressure on the at least one load cell as the load increases;
contacting the at least one roller with the moving conveyor belt, wherein the at least one roller rotates in response to movement of the conveyor belt;
outputting a generator voltage from a generator operably connected to the at least one roller, wherein an amplitude of the generator voltage corresponds to the speed of the conveyor belt;
inputting the generator voltage to at least one load cell, wherein the at least one load cell is positioned to sense the weight of the material;
outputting at least one load cell voltage, wherein the at least one load cell voltage is determined from a relationship of the generator voltage and a sensed weight of the material; and
determining the weight of the material from a correlation of the at least one load cell voltage with a calibrated load cell voltage.

12. The method of claim 11, wherein the calibrated load cell voltage is determined from a calibration method selected from the group consisting of a static weight calibration, a material calibration, a two-point material calibration, and mixtures thereof.

13. The method of claim 11, further comprising establishing a linear offset for the calibrated load cell voltage when a linear discrepancy is encountered.

14. The method of claim 11, wherein correlating the load cell voltage with the calibrated load cell voltage is accomplished by a computing apparatus.

15. The method of claim 11, wherein the at least one roller is selected from the group consisting of a wheel, a conveyor pulley, an idler roller, and mixtures thereof.

16. The method of claim 11, wherein the at least one load cell comprises a strain gauge load cell, a hydraulic load cell, a hydrostatic load cell, or a piezoelectric load cell.

17. The method of claim 11, wherein the at least one load cell comprises an S-beam load cell.

* * * * *